(12) United States Patent
Andrews (10) Patent No.: US 11,231,140 B1
(45) Date of Patent: Jan. 25, 2022

(54) MULTI-LAYERED CONDUIT

(71) Applicant: Warren Andrews, Linwood, NJ (US)

(72) Inventor: Warren Andrews, Linwood, NJ (US)

( * ) Notice: Subject to any disclaimer, the term of this patent is extended or adjusted under 35 U.S.C. 154(b) by 121 days.

(21) Appl. No.: 16/827,865

(22) Filed: Mar. 24, 2020

(51) Int. Cl.
*F16L 59/02* (2006.01)
*F16L 59/12* (2006.01)
*F16L 59/14* (2006.01)

(52) U.S. Cl.
CPC .............. *F16L 59/029* (2013.01); *F16L 59/12* (2013.01); *F16L 59/143* (2013.01)

(58) Field of Classification Search
CPC .................................. F16L 59/14; F16L 59/147
USPC .................................. 138/110, 115–117, 149
See application file for complete search history.

(56) References Cited

U.S. PATENT DOCUMENTS

| | | | | |
|---|---|---|---|---|
| 3,889,715 A | * | 6/1975 | Lilja | F16L 59/10 138/117 |
| 4,014,369 A | * | 3/1977 | Kobres, Jr. | F16L 59/06 138/112 |
| 4,233,816 A | * | 11/1980 | Hensley | F16L 59/12 138/112 |
| 4,461,323 A | * | 7/1984 | Morikawa | F01N 3/2803 138/115 |
| 4,590,971 A | * | 5/1986 | Webster | F16L 59/143 138/149 |
| 6,199,595 B1 | * | 3/2001 | Baker | F16L 1/24 138/115 |
| 7,622,683 B2 | * | 11/2009 | Corbishley | F16L 59/14 138/149 |
| 2003/0035911 A1 | | 2/2003 | Krist | |
| 2006/0207673 A1 | | 9/2006 | O'Brien | |

FOREIGN PATENT DOCUMENTS

| | | | | |
|---|---|---|---|---|
| JP | 53124363 A | * | 10/1978 | ............... F16L 59/14 |
| JP | 04248098 A | * | 9/1992 | ............... B32B 7/12 |

* cited by examiner

*Primary Examiner* — Patrick F Brinson
(74) *Attorney, Agent, or Firm* — Kyle A. Fletcher, Esq.

(57) ABSTRACT

The multi-layered conduit is an insulating structure. The multi-layer conduit system forms a thermally protected space that prevents a fluid from changing phase while flowing through the multi-layered conduit. The multi-layered conduit comprises a master pipe, a plurality of coaxial prism structures, a plurality of spoke structures, and a plurality of insulating spaces. The plurality of spoke structures interconnect each of the plurality of coaxial prism structures. The master pipe is a pipe inserts through the plurality of coaxial prism structures such that the combination of the master pipe structure and the plurality of coaxial prism structures form a coaxially oriented composite prism structure. The plurality of spoke structures further forms the plurality of insulating spaces. Each of the plurality of insulating spaces is a gas-filled space that inhibits the transfer of heat through the plurality of coaxial prism structures into the master pipe.

17 Claims, 5 Drawing Sheets

MULTI-LAYERED CONDUIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of engineering and engineering elements including pipes and thermal insulation of pipes, more specifically, arrangements for supporting insulation around a pipe wall.

SUMMARY OF INVENTION

The multi-layered conduit is an insulating structure. The insulating structure formed by the multi-layer conduit system forms a thermally protected space that prevents a fluid from changing phase while flowing through the multi-layered conduit. The multi-layered conduit comprises a master pipe, a plurality of coaxial prism structures, a plurality of spoke structures, and a plurality of insulating spaces. The master pipe forms a pipe that transports the fluid through the multi-layered conduit. The plurality of spoke structures interconnect each of the plurality of coaxial prism structures. The master pipe that inserts through the plurality of coaxial prism structures such that that the combination of the master pipe structure and the plurality of coaxial prism structures form a coaxially oriented composite prism structure. The plurality of spoke structures further forms the plurality of insulating spaces. Each of the plurality of insulating spaces is a gas-filled space that inhibits the transfer of heat through the plurality of coaxial prism structures into the master pipe.

These together with additional objects, features and advantages of the multi-layered conduit will be readily apparent to those of ordinary skill in the art upon reading the following detailed description of the presently preferred, but nonetheless illustrative, embodiments when taken in conjunction with the accompanying drawings.

In this respect, before explaining the current embodiments of the multi-layered conduit in detail, it is to be understood that the multi-layered conduit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multi-layered conduit.

It is therefore important that the claims be regarded as including such equivalent construction insofar as they do not depart from the spirit and scope of the multi-layered conduit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
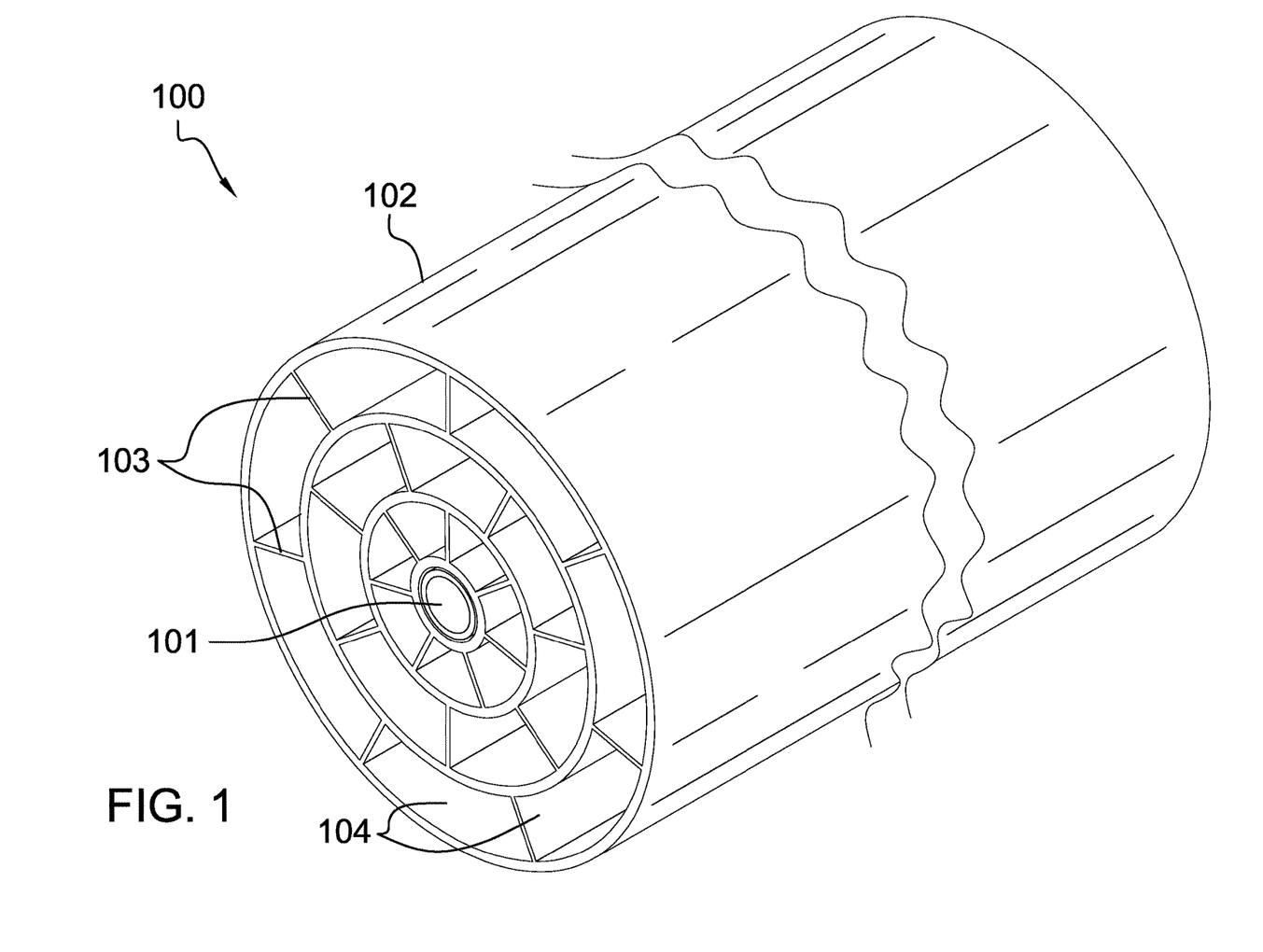
FIG. 1 is a perspective view of an embodiment of the disclosure.
Figure 2:
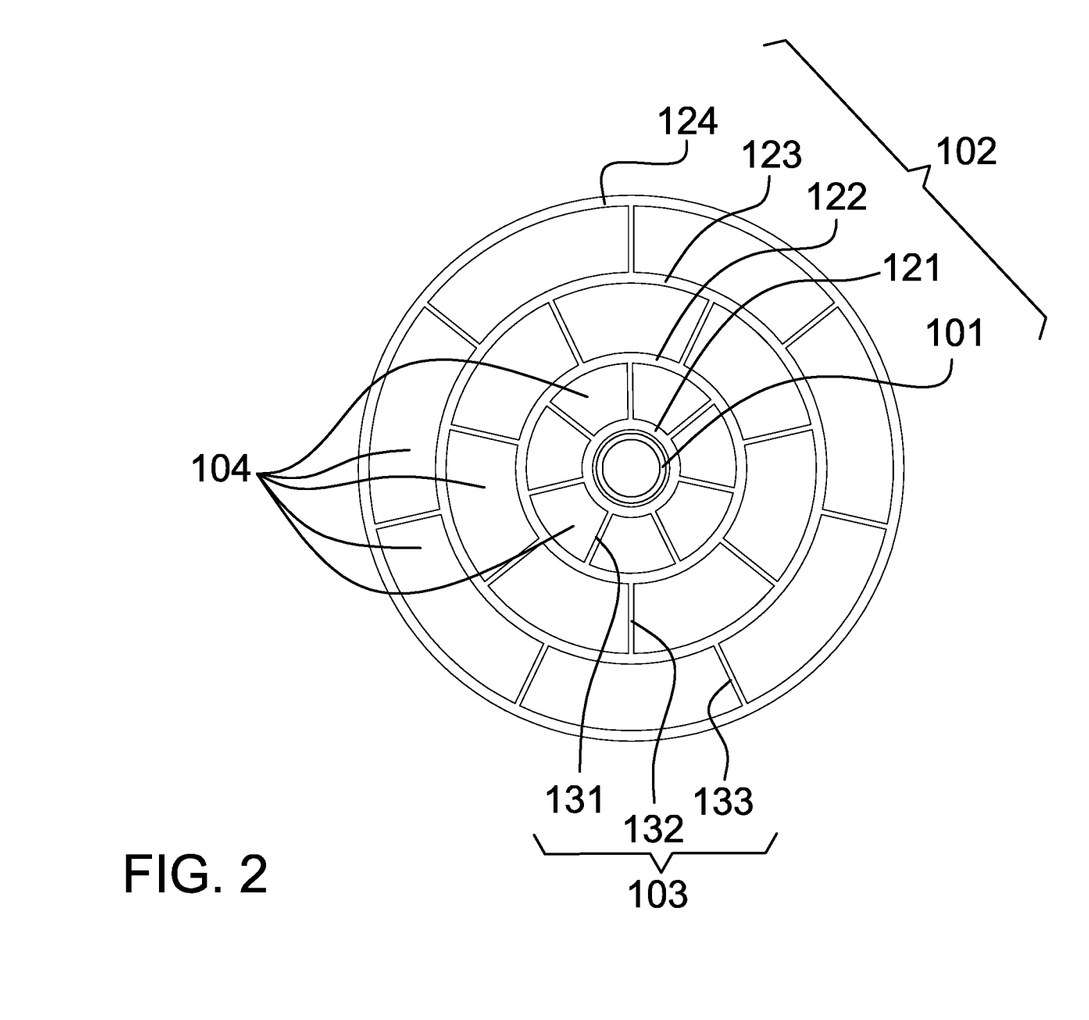
FIG. 2 is a front view of an embodiment of the disclosure.
Figure 3:
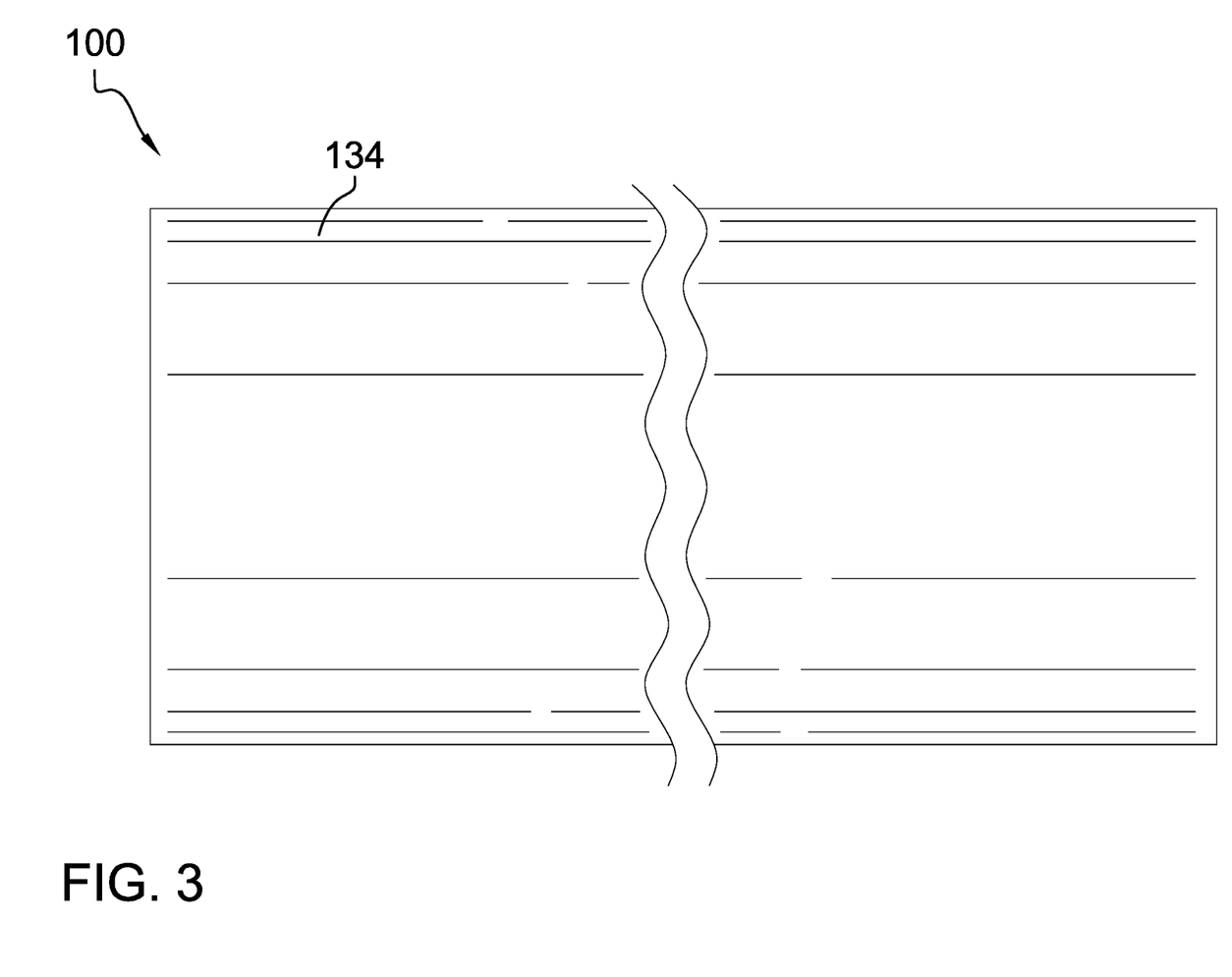
FIG. 3 is a side view of an embodiment of the disclosure.
Figure 4:
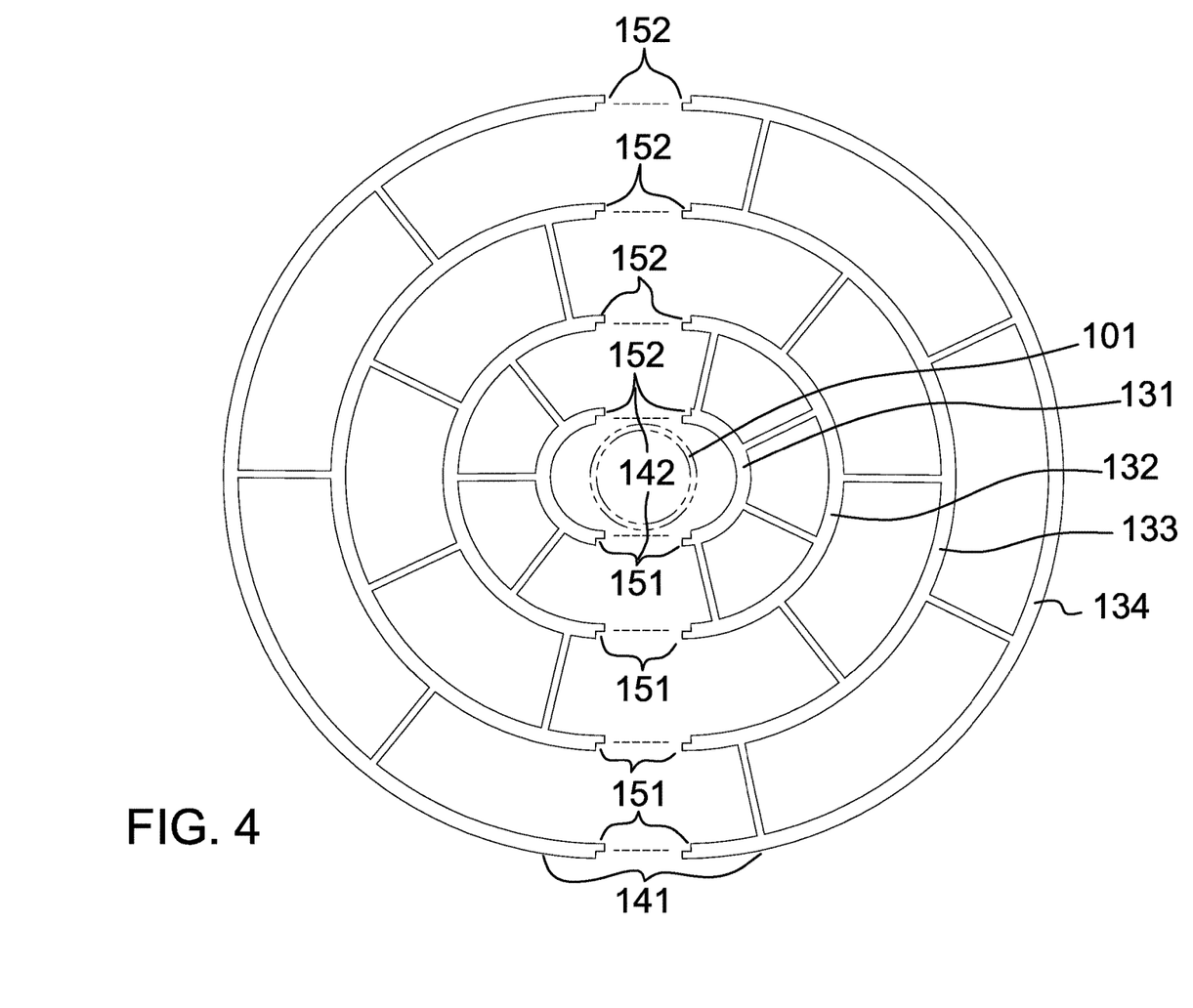
FIG. 4 is a front view of an alternate embodiment of the disclosure.
Figure 5:
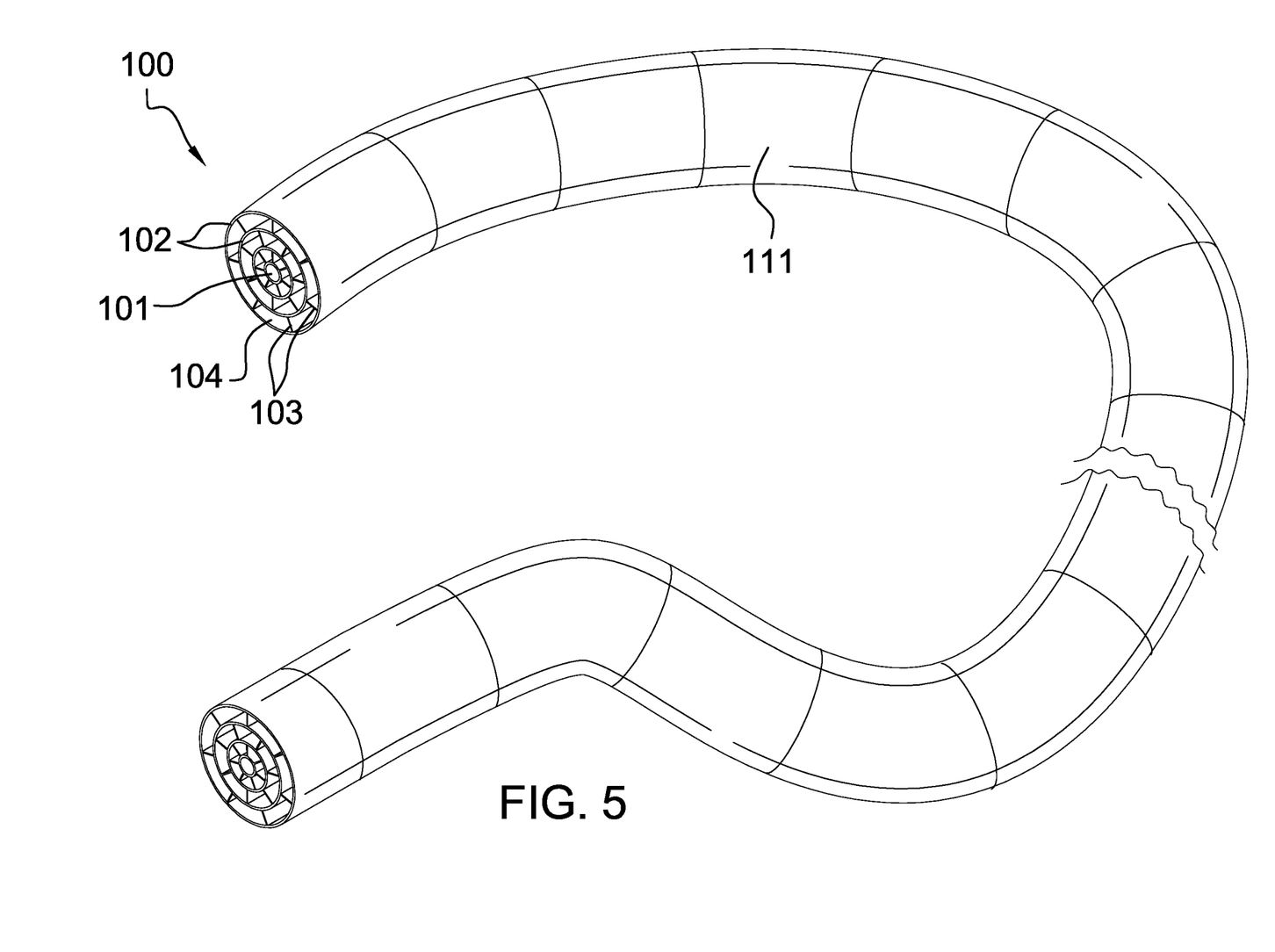
FIG. 5 is a perspective view of an alternate embodiment of the disclosure.

Detailed reference will now be made to one or more potential embodiments of the disclosure, which are illustrated in FIGS. 1 through 5.

The multi-layered conduit 100 (hereinafter invention) is an insulating structure. The insulating structure formed by the multi-layer conduit system forms a thermally protected space that prevents a fluid from changing phase while flowing through the invention 100. The invention 100 comprises a master pipe 101, a plurality of coaxial prism structures 102, a plurality of spoke structures 103, and a plurality of insulating spaces 104. The master pipe 101 forms a pipe that transports the fluid through the invention 100. The plurality of spoke structures 103 interconnect each of the plurality of coaxial prism structures 102. The master pipe 101 inserts through the plurality of coaxial prism structures 102 such that the combination of the master pipe 101 structure and the plurality of coaxial prism structures 102 form a coaxially oriented composite prism structure. The plurality of spoke structures 103 further forms the plurality of insulating spaces 104. Each of the plurality of insulating spaces 104 is a gas-filled space that inhibits the transfer of heat through the plurality of coaxial prism structures 102 into the master pipe 101.

The master pipe 101 is a prism-shaped structure. The master pipe 101 is a hollow structure. The master pipe 101 is a pipe. The master pipe 101 is configured to transport a fluid. The master pipe 101 inserts into the plurality of coaxial prism structures 102 to form a composite prism structure. The master pipe 101 inserts into a thermally protected space formed by the plurality of coaxial prism structures 102, the plurality of spoke structures 103, and the plurality of insulating spaces 104. By thermally protected space is meant that the plurality of coaxial prism structures 102, the plurality of spoke structures 103, and the plurality of insulating spaces 104 forms an insulating structure that protects the fluid flowing through the master pipe 101 from thermally induced changes to the phase and the viscosity of the fluid.

Each of the plurality of coaxial prism structures 102 is a prism-shaped structure. Each of the plurality of coaxial prism structures 102 is a hollow structure. Each of the plurality of coaxial prism structures 102 is a pipe. Any initial coaxial prism structure selected from the plurality of coaxial prism structures 102 is geometrically similar to any subsequent coaxial prism structure selected from the plurality of coaxial prism structures 102. The span of the length of the center axis of any initial coaxial prism structure selected from the plurality of coaxial prism structures 102 equals the span of the length of the center axis of any subsequent coaxial prism structure selected from the plurality of coaxial prism structures 102.

Any coaxial prism structure selected from the plurality of coaxial prism structures 102 is geometrically similar to the master pipe 101. The inner diameter of any coaxial prism structure selected from the plurality of coaxial prism structures 102 is greater than the outer diameter of the master pipe 101 such that the master pipe 101 inserts into the plurality of coaxial prism structures 102 to form a composite prism structure.

The plurality of coaxial prism structures 102 comprises a first coaxial prism structure 121, a second coaxial prism structure 122, a third coaxial prism structure 123, and a fourth coaxial prism structure 124.

The first coaxial prism structure 121 is a prism-shaped structure. The first coaxial prism structure 121 is a hollow structure. The first coaxial prism structure 121 is a pipe. The inner diameter of the first coaxial prism structure 121 is lesser than the outer diameter of the master pipe 101 such that the master pipe 101 inserts into the first coaxial prism structure 121 to complete the composite prism structure of the invention 100.

The second coaxial prism structure 122 is a prism-shaped structure. The second coaxial prism structure 122 is a hollow structure. The second coaxial prism structure 122 is a pipe. The inner diameter of the second coaxial prism structure 122 is lesser than the outer diameter of the first coaxial prism structure 121 such that the first coaxial prism structure 121 inserts into the second coaxial prism structure 122 to form a portion of the composite prism structure formed by the plurality of coaxial prism structures 102 and the plurality of spoke structures 103.

The third coaxial prism structure 123 is a prism-shaped structure. The third coaxial prism structure 123 is a hollow structure. The third coaxial prism structure 123 is a pipe. The inner diameter of the third coaxial prism structure 123 is lesser than the outer diameter of the second coaxial prism structure 122 such that the second coaxial prism structure 122 inserts into the third coaxial prism structure 123 to form a portion of the composite prism structure formed by the plurality of coaxial prism structures 102 and the plurality of spoke structures 103.

The fourth coaxial prism structure 124 is a prism-shaped structure. The fourth coaxial prism structure 124 is a hollow structure. The fourth coaxial prism structure 124 is a pipe. The inner diameter of the fourth coaxial prism structure 124 is lesser than the outer diameter of the third coaxial prism structure 123 such that the third coaxial prism structure 123 inserts into the fourth coaxial prism structure 124 to form a portion of the composite prism structure formed by the plurality of coaxial prism structures 102 and the plurality of spoke structures 103.

Each of the plurality of spoke structures 103 is a disk-shaped structure. Each of the plurality of spoke structures 103 is an extension structure that sets the reach between the exterior surface of the lateral face of an initial coaxial prism structure selected from the plurality of coaxial prism structures 102 to the interior surface of the lateral face of a subsequent coaxial prism structure selected from the plurality of coaxial prism structures 102. The plurality of spoke structures 103 form spacers that fix the relative positions of the plurality of coaxial prism structures 102 such that the plurality of coaxial prism structures 102 combine to form a composite prism structure.

The lateral face of the disk structure of each spoke structure selected from the plurality of spoke structures 103 attaches to the lateral faces of the prism structures of the initially selected coaxial prism structure and the subsequently selected coaxial prism structure such that the congruent ends of the disk structure of the selected spoke structure projects radially away from the aligned center axes of the initially selected coaxial prism structure and the subsequently selected coaxial prism structure.

The plurality of spoke structures 103 comprises a first plurality of spoke structures 131, a second plurality of spoke structures 132, and a third plurality of spoke structures 133.

The first plurality of spoke structures 131 is the subset of spoke structures selected from the plurality of spoke structures 103 that attaches the second coaxial prism structure 122 to the first coaxial prism structure 121. The first plurality of spoke structures 131 fixes the position of the second coaxial prism structure 122 relative to the first coaxial prism structure 121. Each spoke structure selected from the first plurality of spoke structures 131 is a disk-shaped structure. Each spoke structure selected from the first plurality of spoke structures 131 attaches the interior lateral face of the second coaxial prism structure 122 to the exterior lateral face of the first coaxial prism structure 121.

The second plurality of spoke structures 132 is the subset of spoke structures selected from the plurality of spoke structures 103 that attaches the third coaxial prism structure to the second coaxial prism structure 122. The second plurality of spoke structures 132 fixes the position of the third coaxial prism structure 123 relative to the second coaxial prism structure 122. Each spoke structure selected from the second plurality of spoke structures 132 is a disk-shaped structure. Each spoke structure selected from the second plurality of spoke structures 132 attaches the interior lateral face of the third coaxial prism structure 123 to the exterior lateral face of the second coaxial prism structure 122.

The third plurality of spoke structures 133 is the subset of spoke structures selected from the plurality of spoke structures 103 that attaches the fourth coaxial prism structure 124 to the third coaxial prism structure 123. The third plurality of spoke structures 133 fixes the position of the fourth coaxial prism structure 124 relative to the third coaxial prism structure 123. Each spoke structure selected from the third plurality of spoke structures 133 is a disk-shaped structure. Each spoke structure selected from the third plurality of spoke structures 133 attaches the interior lateral face of the fourth coaxial prism structure 124 to the exterior lateral face of the third coaxial prism structure 123.

Each of the plurality of insulating spaces 104 is a negative space that is formed within the composite prism structure formed by the plurality of coaxial prism structures 102 and the plurality of spoke structures 103. Each of the plurality of insulating spaces 104 is bounded by: a) the exterior surface of an initial coaxial prism structure selected from the plurality of coaxial prism structures 102; b) interior surface of a subsequent coaxial prism structure selected from the plurality of coaxial prism structures 102; c) a first spoke structure selected from the plurality of spoke structures 103; and, d) a second spoke structure selected from the plurality of spoke structures 103.

The negative space that forms each of the plurality of insulating spaces 104 is a prism-shaped structure. The prism-shaped structure formed by each of the plurality of insulating spaces 104 is formed within the composite prism structure formed by the plurality of coaxial prism structures 102 and the plurality of spoke structures 103 such that each of the plurality of insulating spaces 104 forms a lateral prism structure with one or more coaxial prism structures selected from the plurality of spoke structures 103. Each of the plurality of insulating spaces 104 creates a gas-filled space that insulates the master pipe 101.

In a second potential embodiment of the disclosure, the invention 100: a) the master pipe 101 is formed as a flexible hose; and, b) a plurality of instantiations of the composite prism structure formed by the plurality of coaxial prism structures 102 and the plurality of spoke structures 103 are interconnected to form a conduit structure 111. The master pipe 101 inserts through the entire composite prism structure that forms the conduit structure 111. The conduit structure 111 is a bimodal flexible structure. The bimodal flexible structure is defined elsewhere in this disclosure. The conduit structure 111 is further defined elsewhere in this disclosure.

The conduit structure 111 forms a non-Euclidean composite prism structure. The conduit structure 111 resists deformation from forces that are radially applied to the exterior lateral face of the composite prism structure formed by the plurality of coaxial prism structures 102 and the plurality of spoke structures 103. The conduit structure 111 allows the center axis of the composite prism structure formed by the plurality of coaxial prism structures 102 and the plurality of spoke structures 103 to be curved to align with the non-Euclidean curvature of the hose that forms the master pipe 101.

In a third potential embodiment of the disclosure, each coaxial prism structure selected from the plurality of coaxial prism structures 102 is formed as a prismatic bifurcation 141. The prismatic bifurcation 141 is defined elsewhere in this disclosure. The lateral faces of the prismatic bifurcation 141 of each selected coaxial prism structure are joined together using the plurality of fastening structures 142. The plurality of fastening structures 142 removably attaches the bifurcated structures of the selected coaxial prism structure to form the prism structure of the selected coaxial prism structure.

The plurality of fastening structures 142 further comprises a first fastening structure 151 and a second fastening structure 152. The first fastening structure 151 removably attaches the first edges of the lateral faces of the prismatic bifurcations 141 of the selected coaxial prism structure. The second fastening structure 152 removably attaches the second edges of the lateral faces of the prismatic bifurcations 141 of the selected coaxial prism structure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Armor: As used in this disclosure, armor refers to a rigid structure used to form a guard that creates a protected space.

Bimodal Flexible Structure: As used in this disclosure, a bimodal flexible structure is a structure that: a) responds to forces that are applied to one or more dimensional axes of the bimodal flexible structure in the manner of a rigid structure; while, b) simultaneously responding to forces that are applied to a dimensional axis that is perpendicular to the one or more dimensional axes described in (a) in the manner of a semi-rigid structure with an inelastic nature. A conduit structure is an example of a bimodal flexible structure. Specifically, a conduit structure acts as a rigid structure to forces that are applied in a radial direction towards the center axis of the prism structure of the conduit structure while being allowing the prism structure of the conduit to bend such that the conduit can be shaped into a non-Euclidean prism.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coaxial: As used in this disclosure, coaxial is a term that refers to a first object that is inserted or contained within a second object such: 1) that the first object and the second object share the same center point if the or first object and the second object are treated as a two-dimensional objects; or, 2) that the first object and the second object share the same center axis if the or first object and the second object are treated as a prism. Coaxial objects are often referred to as concentric.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Conduit Structure: As used in this disclosure, a conduit structure is an armor structure. The armor structure formed by the conduit structure protects the hollow interior of the conduit structure. The conduit structure forms a flexible hollow tubular prism-shaped structure. The conduit structure is a composite prism structure formed from a plurality of rigid tubular structures. Any first rigid tubular structure selected from the plurality of rigid tubular structures inserts into a second rigid tubular structure such that the second rigid tubular structure rotates relative to the first rigid tubular structure in a manner that allows a cant to be formed between the center axis of the first rigid tubular structure and the center axis of the second rigid tubular structure. Each of the plurality of rigid tubular structures are assembled as a daisy chain in the manner described above. The rigid nature of each of the plurality of rigid tubular structures protects the interior of conduit structure from radial forces that are applied directly to any rigid tubular structure selected from the plurality of rigid tubular structures. The ability any two rigid tubular structures selected from the plurality of rigid tubular structures to rotate relative to each other provides the conduit with a flexible nature that allows the conduit structure to form a non-Euclidean prism structure by curving the center axis of the composite prism structure. The conduit structure is considered a flexible structure with an inelastic nature. The modulus of deformation of the flexible nature of the conduit structure is controlled by controlling the friction caused by the rotation of the second rigid tubular structure within the first rigid tubular structure. The conduit structure is an example of a bimodal flexible structure.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Daisy Chain: As used in this disclosure, daisy chain is a term that describes a series of objects that are linked together in a linear fashion. When referring to an electrical circuit, a daisy chain refers to a collection of electrical circuits interconnected using a series circuit.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Fastener: As used in this disclosure, a fastener is a device that is used to join or affix a first object to a second object.

Flexible: As used in this disclosure, flexible refers to an object or material that will deform when a force is applied to it but that will not necessarily return to its original shape when the deforming force is removed.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Inelastic Nature: As used in this disclosure, an inelastic nature refers to a flexible structure that maintains its new shape after the flexible structure has been deformed.

Inner Dimension: As used in this disclosure, the term inner dimension describes the span from a first inside or interior surface of a container to a second inside or interior surface of a container. The term is used in much the same way that a plumber would refer to the inner diameter of a pipe.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is used as a relational term that implies that an object is contained within the boundary of a structure or a space.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Liquid: As used in this disclosure, a liquid refers to a state (phase) of matter that is fluid and that maintains, for a given pressure, a fixed volume that is independent of the volume of the container.

Negative Space: As used in this disclosure, negative space is a method of defining an object through the use of open or empty space as the definition of the object itself, or, through the use of open or empty space to describe the boundaries of an object.

Non-Euclidean Prism: As used in this disclosure, a non-Euclidean prism is a prism structure wherein the center axis of the prism lies on a non-Euclidean plane or is otherwise formed with a curvature.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Bifurcation: As used in this disclosure, a prismatic bifurcation refers to the bifurcation of a prism structure by a plane wherein the bifurcating plane does not intersect the center axis of the prism structure. In a prismatic bifurcation, the center axis can lie on the bifurcating plane.

Protected Space: As used in this disclosure, a protected space is a space formed by a boundary structure. The boundary structure forms a barrier that protects objects within the protected space from potential dangers from the other side of the boundary.

Radial: As used in this disclosure, the term radial refers to a direction that: 1) is perpendicular to an identified central axis; or, 2) projects away from a center point.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Viscosity: As used in this disclosure, viscosity refers to the resistance of a liquid or an elastic material to deformation. Higher viscosity would refer to a greater resistance to flow or to deformation.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective structure comprising
    a master pipe, a plurality of coaxial prism structures, a plurality of spoke structures, and a plurality of insulating spaces;

wherein the plurality of spoke structures interconnect each of the plurality of coaxial prism structures;
wherein the plurality of spoke structures further forms the plurality of insulating spaces;
wherein the master pipe inserts through the plurality of coaxial prism structures such that the combination of the master pipe structure and the plurality of coaxial prism structures form a coaxially oriented composite prism structure;
wherein the protective structure is an insulating structure;
wherein the master pipe transports a fluid through the protective structure;
wherein each of the plurality of spoke structures is a disk-shaped structure;
wherein each of the plurality of spoke structures is an extension structure that sets the reach between the exterior surface of the lateral face of an initial coaxial prism structure selected from the plurality of coaxial prism structures to the interior surface of the lateral face of a subsequent coaxial prism structure selected from the plurality of coaxial prism structures;
wherein the plurality of spoke structures form spacers that fix the relative positions of the plurality of coaxial prism structures such that the plurality of coaxial prism structures combine to form a composite prism structure;
wherein the lateral face of the disk structure of each spoke structure selected from the plurality of spoke structures attaches to the lateral faces of the prism structures of the initially selected coaxial prism structure and the subsequently selected coaxial prism structure such that the congruent ends of the disk structure of the selected spoke structure projects radially away from the aligned center axes of the initially selected coaxial prism structure and the subsequently selected coaxial prism structure.

2. The protective structure according to claim 1 wherein each of the plurality of insulating spaces is a gas-filled space that inhibits the transfer of heat through the plurality of coaxial prism structures into the master pipe.

3. The protective structure according to claim 2 wherein the master pipe inserts into the plurality of coaxial prism structures to form a composite prism structure.

4. The protective structure according to claim 3
wherein the insulating structure formed by the protective structure forms a thermally protected space that prevents the fluid from changing phase while flowing through the master pipe;
wherein the master pipe inserts into the thermally protected space formed by the plurality of coaxial prism structures, the plurality of spoke structures, and the plurality of insulating spaces;
wherein by thermally protected space is meant that the plurality of coaxial prism structures, the plurality of spoke structures, and the plurality of insulating spaces form an insulating structure that protects the fluid flowing through the master pipe from thermally induced changes to the phase and the viscosity of the fluid.

5. The protective structure according to claim 4
wherein each of the plurality of coaxial prism structures is a prism-shaped structure;
wherein each of the plurality of coaxial prism structures is a hollow structure;
wherein each of the plurality of coaxial prism structures is a pipe.

6. The protective structure according to claim 5
wherein any initial coaxial prism structure selected from the plurality of coaxial prism structures is geometrically similar to any subsequent coaxial prism structure selected from the plurality of coaxial prism structures;
wherein the span of the length of the center axis of any initial coaxial prism structure selected from the plurality of coaxial prism structures equals the span of the length of the center axis of any subsequent coaxial prism structure selected from the plurality of coaxial prism structures.

7. The protective structure according to claim 6
wherein any coaxial prism structure selected from the plurality of coaxial prism structures is geometrically similar to the master pipe;
wherein the inner diameter of any coaxial prism structure selected from the plurality of coaxial prism structures is greater than the outer diameter of the master pipe such that the master pipe inserts into the plurality of coaxial prism structures to form a composite prism structure.

8. The protective structure according to claim 7
wherein each of the plurality of insulating spaces is a negative space that is formed within the composite prism structure formed by the plurality of coaxial prism structures and the plurality of spoke structures;
wherein each of the plurality of insulating spaces is bounded by: a) the exterior surface of an initial coaxial prism structure selected from the plurality of coaxial prism structures; b) interior surface of a subsequent coaxial prism structure selected from the plurality of coaxial prism structures; c) a first spoke structure selected from the plurality of spoke structures; and, d) a second spoke structure selected from the plurality of spoke structures;
wherein the negative space that forms each of the plurality of insulating spaces is a prism-shaped structure;
wherein the prism-shaped structure formed by each of the plurality of insulating spaces is formed within the composite prism structure formed by the plurality of coaxial prism structures and the plurality of spoke structures such that each of the plurality of insulating spaces forms a lateral prism structure with one or more coaxial prism structures selected from the plurality of spoke structures.

9. The protective structure according to claim 8
wherein the plurality of coaxial prism structures comprises a first coaxial prism structure, a second coaxial prism structure, a third coaxial prism structure, and a fourth coaxial prism structure;
wherein the first coaxial prism structure is a prism-shaped structure;
wherein the first coaxial prism structure is a hollow structure;
wherein the first coaxial prism structure is a pipe;
wherein the inner diameter of the first coaxial prism structure is lesser than the outer diameter of the master pipe such that the master pipe inserts into the first coaxial prism structure to complete the composite prism structure of the protective structure;
wherein the second coaxial prism structure is a prism-shaped structure;
wherein the second coaxial prism structure is a hollow structure;
wherein the second coaxial prism structure is a pipe;
wherein the inner diameter of the second coaxial prism structure is lesser than the outer diameter of the first coaxial prism structure such that the first coaxial prism structure inserts into the second coaxial prism structure to form a portion of the composite prism structure formed by the plurality of coaxial prism structures and the plurality of spoke structures;

wherein the third coaxial prism structure is a prism-shaped structure;

wherein the third coaxial prism structure is a hollow structure;

wherein the third coaxial prism structure is a pipe;

wherein the inner diameter of the third coaxial prism structure is lesser than the outer diameter of the second coaxial prism structure such that the second coaxial prism structure inserts into the third coaxial prism structure to form a portion of the composite prism structure formed by the plurality of coaxial prism structures and the plurality of spoke structures;

wherein the fourth coaxial prism structure is a prism-shaped structure;

wherein the fourth coaxial prism structure is a hollow structure;

wherein the fourth coaxial prism structure is a pipe;

wherein the inner diameter of the fourth coaxial prism structure is lesser than the outer diameter of the third coaxial prism structure such that the third coaxial prism structure inserts into the fourth coaxial prism structure to form a portion of the composite prism structure formed by the plurality of coaxial prism structures and the plurality of spoke structures.

10. The protective structure according to claim 9 wherein the plurality of spoke structures comprises a first plurality of spoke structures, a second plurality of spoke structures, and a third plurality of spoke structures;

wherein the first plurality of spoke structures is the subset of spoke structures selected from the plurality of spoke structures that attaches the second coaxial prism structure to the first coaxial prism structure;

wherein the first plurality of spoke structures fixes the position of the second coaxial prism structure relative to the first coaxial prism structure;

wherein each spoke structure selected from the first plurality of spoke structures is a disk-shaped structure;

wherein each spoke structure selected from the first plurality of spoke structures attaches the interior lateral face of the second coaxial prism structure to the exterior lateral face of the first coaxial prism structure;

wherein the second plurality of spoke structures is the subset of spoke structures selected from the plurality of spoke structures that attaches the third coaxial prism structure to the second coaxial prism structure;

wherein the second plurality of spoke structures fixes the position of the third coaxial prism structure relative to the second coaxial prism structure;

wherein each spoke structure selected from the second plurality of spoke structures is a disk-shaped structure;

wherein each spoke structure selected from the second plurality of spoke structures attaches the interior lateral face of the third coaxial prism structure to the exterior lateral face of the second coaxial prism structure;

wherein the third plurality of spoke structures is the subset of spoke structures selected from the plurality of spoke structures that attaches the fourth coaxial prism structure to the third coaxial prism structure;

wherein the third plurality of spoke structures fixes the position of the fourth coaxial prism structure relative to the third coaxial prism structure;

wherein each spoke structure selected from the third plurality of spoke structures is a disk-shaped structure;

wherein each spoke structure selected from the third plurality of spoke structures attaches the interior lateral face of the fourth coaxial prism structure to the exterior lateral face of the third coaxial prism structure.

11. The protective structure according to claim 10 wherein each coaxial prism structure selected from the plurality of coaxial prism structures is formed as a prismatic bifurcation;

wherein the lateral faces of the prismatic bifurcation of each selected coaxial prism structure are joined together using the plurality of fastening structures;

wherein the plurality of fastening structures removably attaches the bifurcated structures of the selected coaxial prism structure to form the prism structure of the selected coaxial prism structure;

wherein the plurality of fastening structures further comprises a first fastening structure and a second fastening structure;

wherein the first fastening structure removably attaches the first edges of the lateral faces of the prismatic bifurcations of the selected coaxial prism structure;

wherein the second fastening structure removably attaches the second edges of the lateral faces of the prismatic bifurcations of the selected coaxial prism structure.

12. The protective structure according to claim 2 wherein the master pipe is a prism-shaped structure;

wherein the master pipe is a hollow structure;

wherein the master pipe is a hose;

wherein any initial coaxial prism structure selected from the plurality of coaxial prism structures is geometrically similar to any subsequent coaxial prism structure selected from the plurality of coaxial prism structures;

wherein the span of the length of the center axis of any initial coaxial prism structure selected from the plurality of coaxial prism structures equals the span of the length of the center axis of any subsequent coaxial prism structure selected from the plurality of coaxial prism structures;

wherein any coaxial prism structure selected from the plurality of coaxial prism structures is geometrically similar to the master pipe;

wherein the inner diameter of any coaxial prism structure selected from the plurality of coaxial prism structures is greater than the outer diameter of the master pipe such that the master pipe inserts into the plurality of coaxial prism structures to form a composite prism structure.

13. The protective structure according to claim 12 wherein a plurality of instantiations of the composite prism structure formed by the plurality of coaxial prism structures and the plurality of spoke structures are interconnected to form a conduit structure;

wherein the master pipe inserts through the entire composite prism structure that forms the conduit structure;

wherein the conduit structure is a bimodal flexible structure;

wherein the conduit structure forms a non-Euclidean composite prism structure;

wherein the conduit structure resists deformation from forces that are radially applied to the exterior lateral face of the composite prism structure formed by the plurality of coaxial prism structures and the plurality of spoke structures;

wherein the conduit structure allows the center axis of the composite prism structure formed by the plurality of coaxial prism structures and the plurality of spoke structures to be curved to align with the non-Euclidean curvature of the hose that forms the master pipe.

14. The protective structure according to claim 13
wherein each of the plurality of insulating spaces is a negative space that is formed within the composite prism structure formed by the plurality of coaxial prism structures and the plurality of spoke structures;
wherein each of the plurality of insulating spaces is bounded by: a) the exterior surface of an initial coaxial prism structure selected from the plurality of coaxial prism structures; b) interior surface of a subsequent coaxial prism structure selected from the plurality of coaxial prism structures; c) a first spoke structure selected from the plurality of spoke structures; and, d) a second spoke structure selected from the plurality of spoke structures;
wherein the negative space that forms each of the plurality of insulating spaces is a prism-shaped structure;
wherein the prism-shaped structure formed by each of the plurality of insulating spaces is formed within the composite prism structure formed by the plurality of coaxial prism structures and the plurality of spoke structures such that each of the plurality of insulating spaces forms a lateral prism structure with one or more coaxial prism structures selected from the plurality of spoke structures.

15. The protective structure according to claim 14
wherein the plurality of coaxial prism structures comprises a first coaxial prism structure, a second coaxial prism structure, a third coaxial prism structure, and a fourth coaxial prism structure;
wherein the first coaxial prism structure is a prism-shaped structure;
wherein the first coaxial prism structure is a hollow structure;
wherein the first coaxial prism structure is a pipe;
wherein the inner diameter of the first coaxial prism structure is lesser than the outer diameter of the master pipe such that the master pipe inserts into the first coaxial prism structure to complete the composite prism structure of the protective structure;
wherein the second coaxial prism structure is a prism-shaped structure;
wherein the second coaxial prism structure is a hollow structure;
wherein the second coaxial prism structure is a pipe;
wherein the inner diameter of the second coaxial prism structure is lesser than the outer diameter of the first coaxial prism structure such that the first coaxial prism structure inserts into the second coaxial prism structure to form a portion of the composite prism structure formed by the plurality of coaxial prism structures and the plurality of spoke structures;
wherein the third coaxial prism structure is a prism-shaped structure;
wherein the third coaxial prism structure is a hollow structure;
wherein the third coaxial prism structure is a pipe;
wherein the inner diameter of the third coaxial prism structure is lesser than the outer diameter of the second coaxial prism structure such that the second coaxial prism structure inserts into the third coaxial prism structure to form a portion of the composite prism structure formed by the plurality of coaxial prism structures and the plurality of spoke structures;
wherein the fourth coaxial prism structure is a prism-shaped structure;
wherein the fourth coaxial prism structure is a hollow structure;
wherein the fourth coaxial prism structure is a pipe;
wherein the inner diameter of the fourth coaxial prism structure is lesser than the outer diameter of the third coaxial prism structure such that the third coaxial prism structure inserts into the fourth coaxial prism structure to form a portion of the composite prism structure formed by the plurality of coaxial prism structures and the plurality of spoke structures.

16. The protective structure according to claim 15
wherein the plurality of spoke structures comprises a first plurality of spoke structures, a second plurality of spoke structures, and a third plurality of spoke structures;
wherein the first plurality of spoke structures is the subset of spoke structures selected from the plurality of spoke structures that attaches the second coaxial prism structure to the first coaxial prism structure;
wherein the first plurality of spoke structures fixes the position of the second coaxial prism structure relative to the first coaxial prism structure;
wherein each spoke structure selected from the first plurality of spoke structures is a disk-shaped structure;
wherein each spoke structure selected from the first plurality of spoke structures attaches the interior lateral face of the second coaxial prism structure to the exterior lateral face of the first coaxial prism structure;
wherein the second plurality of spoke structures is the subset of spoke structures selected from the plurality of spoke structures that attaches the third coaxial prism structure to the second coaxial prism structure;
wherein the second plurality of spoke structures fixes the position of the third coaxial prism structure relative to the second coaxial prism structure;
wherein each spoke structure selected from the second plurality of spoke structures is a disk-shaped structure;
wherein each spoke structure selected from the second plurality of spoke structures attaches the interior lateral face of the third coaxial prism structure to the exterior lateral face of the second coaxial prism structure;
wherein the third plurality of spoke structures is the subset of spoke structures selected from the plurality of spoke structures that attaches the fourth coaxial prism structure to the third coaxial prism structure;
wherein the third plurality of spoke structures fixes the position of the fourth coaxial prism structure relative to the third coaxial prism structure;
wherein each spoke structure selected from the third plurality of spoke structures is a disk-shaped structure;
wherein each spoke structure selected from the third plurality of spoke structures attaches the interior lateral face of the fourth coaxial prism structure to the exterior lateral face of the third coaxial prism structure.

17. The protective structure according to claim 16
wherein each coaxial prism structure selected from the plurality of coaxial prism structures is formed as a prismatic bifurcation;
wherein the lateral faces of the prismatic bifurcation of each selected coaxial prism structure are joined together using the plurality of fastening structures;
wherein the plurality of fastening structures removably attaches the bifurcated structures of the selected coaxial prism structure to form the prism structure of the selected coaxial prism structure;

wherein the plurality of fastening structures further comprises a first fastening structure and a second fastening structure;

wherein the first fastening structure removably attaches the first edges of the lateral faces of the prismatic bifurcations of the selected coaxial prism structure;

wherein the second fastening structure removably attaches the second edges of the lateral faces of the prismatic bifurcations of the selected coaxial prism structure.

* * * * *